(12) United States Patent
Kneller et al.

(10) Patent No.: US 8,028,958 B2
(45) Date of Patent: Oct. 4, 2011

(54) ADJUSTABLE WIDTH SEATS

(75) Inventors: Heidi J. Kneller, Bellevue, WA (US); Shawn A. Claflin, Seattle, WA (US)

(73) Assignee: The Boeing Company, Chicago, IL (US)

(*) Notice: Subject to any disclaimer, the term of this patent is extended or adjusted under 35 U.S.C. 154(b) by 473 days.

(21) Appl. No.: 12/262,686

(22) Filed: Oct. 31, 2008

(65) Prior Publication Data

US 2010/0109400 A1   May 6, 2010

(51) Int. Cl.
*B64D 11/06* (2006.01)

(52) U.S. Cl. ................................................ 244/118.6

(58) Field of Classification Search ............. 244/122 R, 244/118.6, 118.5; 297/115, 118, 130, 232, 297/233, 257, 107, 124, 394, 248, 452.4, 297/411.37
See application file for complete search history.

(56) References Cited

U.S. PATENT DOCUMENTS

| | | | | |
|---|---|---|---|---|
| 3,743,351 A | * | 7/1973 | Harris | 297/107 |
| 3,893,729 A | * | 7/1975 | Sherman et al. | 297/118 |
| 4,498,649 A | * | 2/1985 | Toll | 244/118.6 |
| 4,773,703 A | | 9/1988 | Krugener et al. | |
| 4,881,702 A | * | 11/1989 | Slettebak | 244/118.6 |
| 5,098,157 A | | 3/1992 | Surot | |
| 5,104,065 A | * | 4/1992 | Daharsh et al. | 244/118.6 |
| 5,131,607 A | * | 7/1992 | Arnold et al. | 244/118.6 |
| 5,178,345 A | * | 1/1993 | Peltola et al. | 244/118.6 |
| 5,509,722 A | * | 4/1996 | Beroth | 297/452.4 |
| 5,547,259 A | | 8/1996 | Fredrick | |
| 5,553,813 A | | 9/1996 | Merensky | |
| 5,558,309 A | * | 9/1996 | Marechal | 248/424 |
| 5,558,398 A | | 9/1996 | Santos | |
| 5,823,618 A | | 10/1998 | Fox et al. | |
| 5,906,416 A | | 5/1999 | Rasmussen | |
| 6,076,768 A | * | 6/2000 | Durand et al. | 244/118.6 |
| 7,578,551 B2 | * | 8/2009 | Linero | 297/107 |
| 7,594,701 B2 | * | 9/2009 | Kawabata et al. | 297/452.63 |
| 7,857,259 B2 | * | 12/2010 | Baatz et al. | 244/122 R |

* cited by examiner

Primary Examiner — Richard Price, Jr.
(74) Attorney, Agent, or Firm — Yee & Associates, P.C.

(57) ABSTRACT

A seating system may comprise a seat base, a seat back, and a width adjustable section. The width adjustable section may be located within the seat base and the seat back. The width adjustable section may be capable of being configured to change a width of the seat base and the seat back.

26 Claims, 10 Drawing Sheets

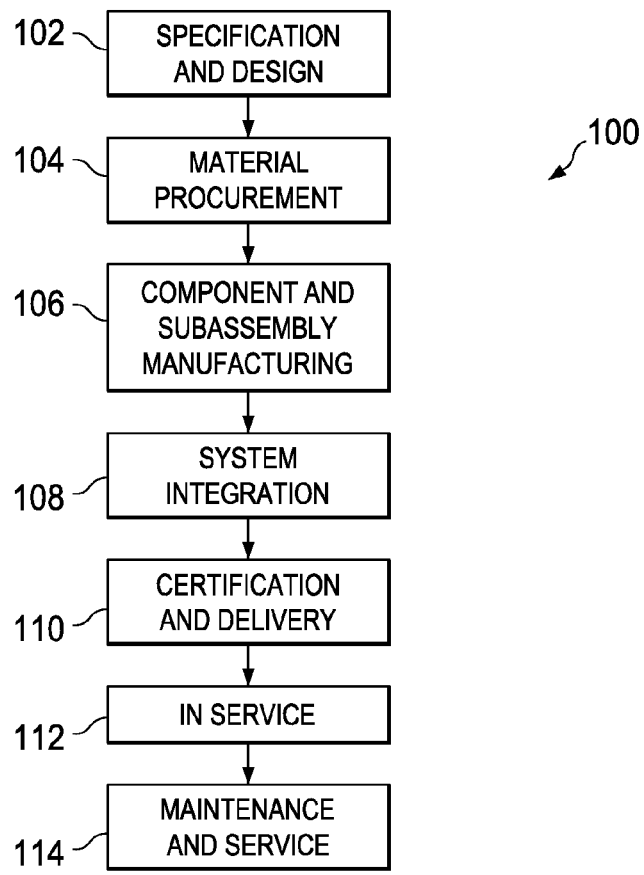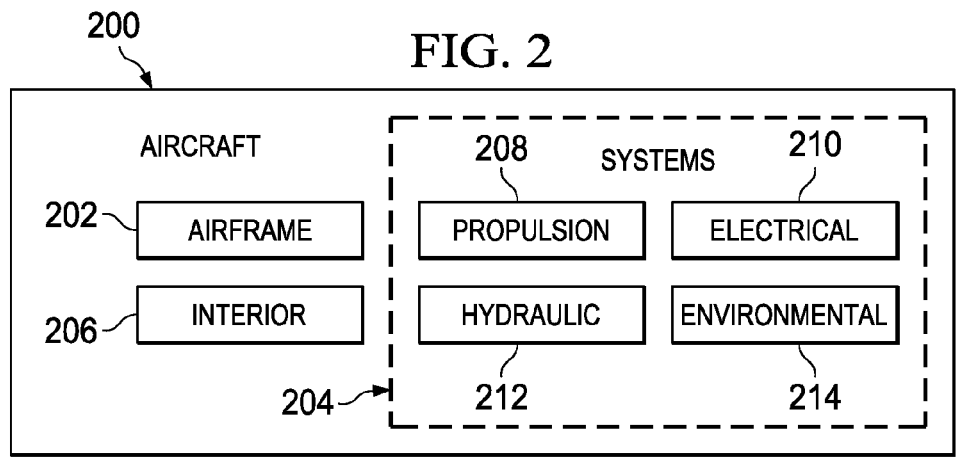

ADJUSTABLE WIDTH SEATS

BACKGROUND INFORMATION

1. Field

The present disclosure relates generally to aircraft and, in particular, to aircraft cabins. Still more particularly, the present disclosure relates to a method and apparatus for allocating seating space within the cabin of an aircraft.

2. Background

An aircraft cabin may be the portion of an aircraft that passengers may occupy during flight. An aircraft cabin may also be referred to just as a cabin or passenger cabin.

Seats within an aircraft cabin may typically be arranged in rows and aisles. In these examples, seats may be chairs in an aircraft to accommodate passengers during flight.

An aircraft may have different sections in which seats may provide different amounts of width or space for a passenger. For example, without limitation, in higher-class travel, more space may be provided for individual seats. For example, without limitation, seats may have more width in a first-class portion of a cabin as opposed to an economy-class portion of a cabin. Further, the pitch or distance between rows of seats also may be adjusted.

Seats may include various amenities. For example, without limitation, seats may recline, include lumbar support, have adjustable headrests, include electronics, and have other suitable features. One particular feature of interest to many passengers may be the width of a seat. The width of a seat may change in different travel classes.

Currently, seating configurations in a passenger cabin may be readjusted to change widths and/or pitch. These types of adjustments, however, may require time and may take an aircraft out of service. For example, without limitation, to change from seats of one width to another width, the existing seats of one width may be removed from the aircraft. Then, the new seats of another width may be placed in the aircraft. In adjusting the pitch of the rows in an aircraft, entire seat rows may be moved along mounting rails in the floor of the passenger cabin during maintenance and service.

These types of adjustments, however, may take an aircraft out of service for some period of time. These types of adjustments may reduce revenues of an aircraft.

Therefore, it would be advantageous to have a method and apparatus to adjust seating within a cabin that addresses at least some of the issues described above.

SUMMARY

In view of one or more of the issues described above, the advantageous embodiments provide a method and apparatus to adjust seating within a cabin that addresses at least some of the issues described above.

In an advantageous embodiment, a seating system may comprise a seat base, a seat back, and a width adjustable section. The width adjustable section may be located within the seat base and the seat back. The width adjustable section may be capable of being configured to change a width of the seat base and the seat back.

In another advantageous embodiment, a passenger cabin may comprise an aisle and a plurality of rows of seats. The plurality of rows of seats may be arranged around the aisle. Each seat in a number of seats in the plurality of rows may comprise a reconfigurable seat having a seat base, a seat back, and a width adjustable section located within the seat base and the seat back.

In yet another advantageous embodiment, a method may be present for reconfiguring a passenger cabin. A number of reconfigurable seats may be identified. Each reconfigurable seat in the number of reconfigurable seats may comprise a seat base, a seat back, and a width adjustable section located within the seat base and the seat back. The number of reconfigurable seats may be reconfigured to meet seating space requirements within the passenger cabin.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is a diagram illustrating an aircraft manufacturing and service method in accordance with an advantageous embodiment;

FIG. 2 is a diagram illustrating an aircraft in which an advantageous embodiment may be implemented;

DETAILED DESCRIPTION

Figure 3:
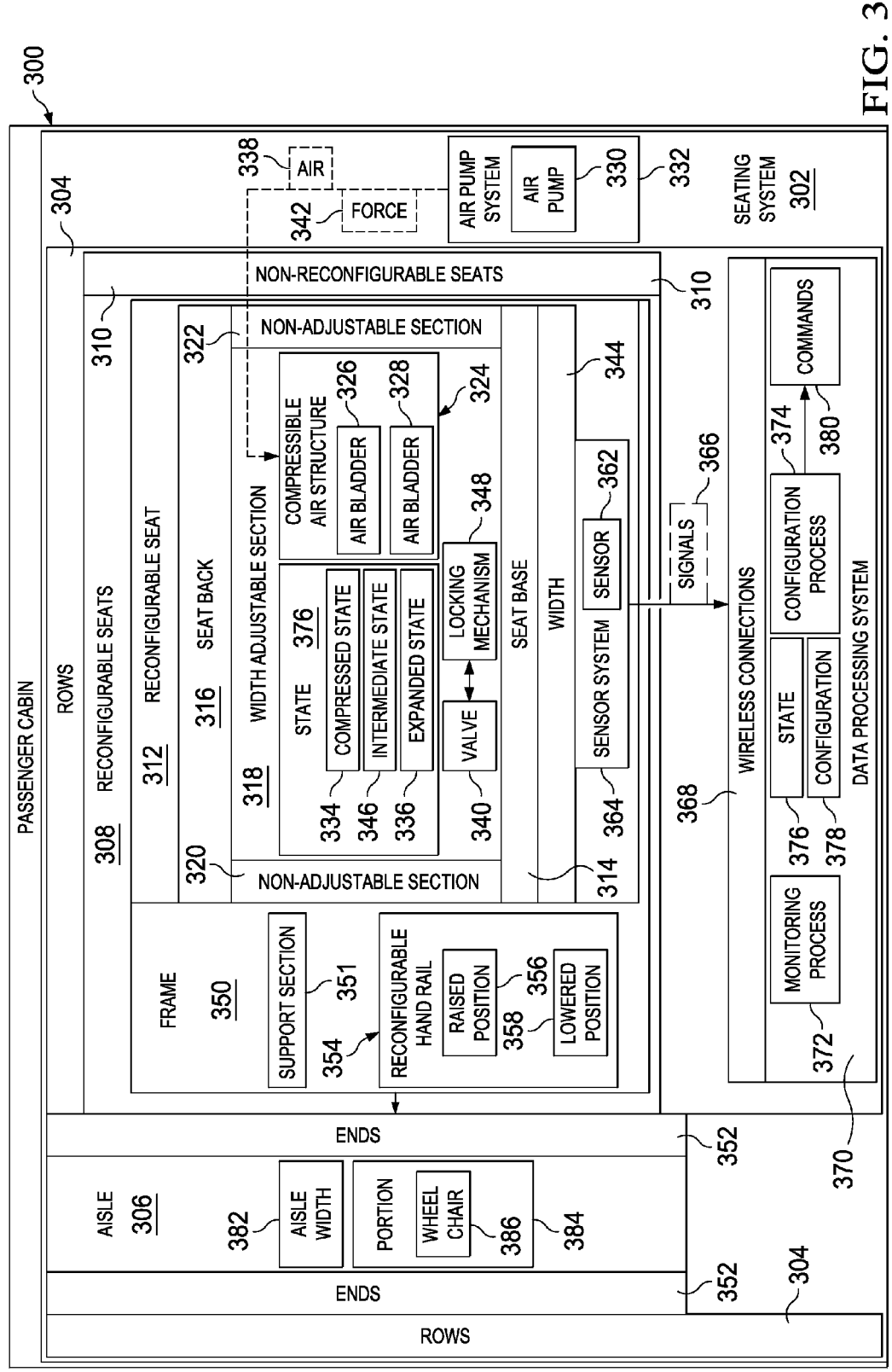
FIG. 3 is a diagram of a passenger cabin in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, without limitation, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

Different advantageous embodiments may be implemented during component and subassembly manufacturing 106 to create adjustable width seats. Further, these seats may be placed into aircraft during system integration 108 and/or maintenance and service 114. Reconfiguration of passenger cabins may be performed during in service 112 using the reconfigurable seats.

The different advantageous embodiments recognize and take into account that removing existing seats and replacing these seats with new seats having different widths may be time consuming. This process may often take an aircraft out of service, resulting in a loss in revenue.

Thus, the different advantageous embodiments provide a method and apparatus in which seats have pressurized sections that may allow for compression and/or expansion of an individual seat. These pressurized sections may be located in both the seat cushion and seat back.

With the different advantageous embodiments, multiple rows of seats may be individually resized and/or seats may be individually resized within rows. This type of resizing may allow for maximum customization and/or optimization of space. This type of resizing of seats may be performed without removing the seats from the passenger cabin. This type of resizing may also be referred to as a reconfiguration of seats. This type of customization and/or optimization may be performed in a relatively short period of time as compared to currently available methods for changing seat widths through the replacement of seats.

Further, by allowing for reconfiguration of seats to a smaller width, increased aisle space may be provided during boarding. Further, the varying width of passenger seats also may accommodate passengers of different widths more comfortably and efficiently.

With reference now to FIG. 3, a diagram of a passenger cabin is depicted in accordance with an advantageous embodiment. Passenger cabin 300 may be an example of a passenger cabin that may be located in interior 206 of aircraft 200 in FIG. 2.

Passenger cabin 300 may include seating system 302. Seating system 302 may contain rows 304 and aisle 306. Aisle 306 may be any type of aisle within passenger cabin 300. For example, without limitation, aisle 306 may be a center aisle or an aisle parallel to another aisle within passenger cabin 300. Rows 304 may be formed from reconfigurable seats 308 and non-reconfigurable seats 310.

Reconfigurable seat 312 may be an example of a reconfigurable seat within reconfigurable seats 308. Reconfigurable seat 312 may have seat base 314 and seat back 316. In these examples, width adjustable section 318 may be located within seat base 314 and/or seat back 316. Width adjustable section 318 may be located between non-adjustable section 320 and non-adjustable section 322 within seat base 314 and seat back 316.

Width adjustable section 318 may comprise compressible air structure 324. Compressible air structure 324 may be, for example, without limitation, air bladder 326 and air bladder 328. Air bladder 326 may be located within seat base 314, while air bladder 328 may be located in seat back 316. Compressible air structure 324 also may take other forms. For example, without limitation, compressible air structure 324 also may be formed from a unidirectional compressible foam, a bellows structure, a honeycomb structure, and/or some other suitable structure capable of expanding and compressing. Air may be used to expand or compress these types of structures.

In these illustrative examples, air pump 330 and air pump system 332 may change compressible air structure 324 between compressed state 334 and expanded state 336. Air pump 330 may pump air 338 into compressible air structure 324 to place compressible air structure 324 in expanded state 336.

Further, compressible air structure 324 may be placed into compressed state 334 by opening valve 340 and applying force 342 to compressible air structure 324. Force 342 may be applied in a number of different ways. For example, without limitation, force 342 may be applied by a human operator and/or by air pump 330 withdrawing air from compressible air structure 324.

Width 344 of reconfigurable seat 312 may be changed to different widths by width adjustable section 318 being moved between compressed state 334 and expanded state 336. Of course, width 344 may be adjusted to other values by changing compressible air structure 324 to intermediate state 346. Intermediate state 346 may be a state in which the amount of air within compressible air structure 324 may be greater than in compressed state 334 and less than in expanded state 336.

Locking mechanism 348 may be used to prevent changes in width adjustable section 318. For example, without limitation, locking mechanism 348 may prevent valve 340 from operating to change states.

In these examples, seat base 314 and seat back 316 may be supported by frame 350. Frame 350 may include support section 351 and reconfigurable hand rail 354. Reconfigurable hand rail 354 may have raised position 356 and lowered position 358. Reconfigurable hand rail 354 may be in lowered position 358 when compressible air structure 324 is in expanded state 336. In this lowered position, reconfigurable hand rail 354 also may provide support for reconfigurable seat 312. When in a lowered position, reconfigurable hand rail 354 may have a configuration that may provide support for seat base 314.

Further, reconfigurable seat 312 may be slidably moved on frame 350 in these examples. When compressible air structure 324 is in compressed state 334, reconfigurable hand rail 354 may be moved to raised position 356. Reconfigurable hand rail 354 may provide support for passengers boarding an aircraft. In these examples, reconfigurable hand rail 354 may be present in reconfigurable seats 308 located at ends 352 of rows 304 by aisle 306.

Sensor 362 in sensor system 364 may monitor width adjustable section 318 in these examples. Sensor 362 may monitor a number of different parameters in monitoring width adjustable section 318. For example, without limitation, sensor 362 may monitor air pressure, current width of width adjustable section 318, and/or some other suitable parameter. Sensor 362 may send signals 366 over wireless connections 368 to data processing system 370.

In these examples, monitoring process 372 and configuration process 374 may execute on data processing system 370. Monitoring process 372 may monitor state 376 of reconfigurable seats 308 in rows 304 to identify configuration 378 for seating system 302. Configuration process 374 may be used to send commands 380 to change configuration 378.

In these illustrative examples, commands 380 may be sent to air pump system 332 to compress and/or decompress compressible air structure 324 to change width 344 of reconfigurable seat 312. Commands 380 may be sent to other seats in reconfigurable seats 308 to make similar changes.

With seating system 302, aisle width 382 may be changed in different portions of aisle 306. Aisle width 382 may be changed to increase width to allow, for example, for easier boarding. Further, aisle width 382 may be reduced as rows are boarded. Further, aisle width 382 may be changed in portions such as, for example, without limitation, to create portion 384 and to increase in a manner that allows for wheelchair 386 to be placed in portion 384.

The illustration of passenger cabin 300 is not meant to imply physical or architectural limitations to the manner in which other advantageous embodiments may be implemented. For example, in other advantageous embodiments, a number of additional aisles in addition to aisle 306 may be used. A number, as used herein, when referring to items refers to one or more items. For example, without limitation, a number of additional aisles is one or more additional aisles in these examples. Further, in other advantageous embodiments, other components in addition to or in place of the ones illustrated may be employed.

Further, in still other advantageous embodiments, some of the depicted components may be omitted. For example, without limitation, reconfigurable hand rail 354 may not be used in all implementations. In some advantageous embodiments, non-reconfigurable seats 310 may be omitted from seating system 302. Also, in other advantageous embodiments, reconfigurable seat 312 may have only non-adjustable section 320 with width adjustable section 318. In this type of implementation, non-adjustable section 322 may be omitted. Further, in other advantageous embodiments, compressible air structure 324 may only require one air bladder rather than air bladder 326 and air bladder 328.

Figure 4:
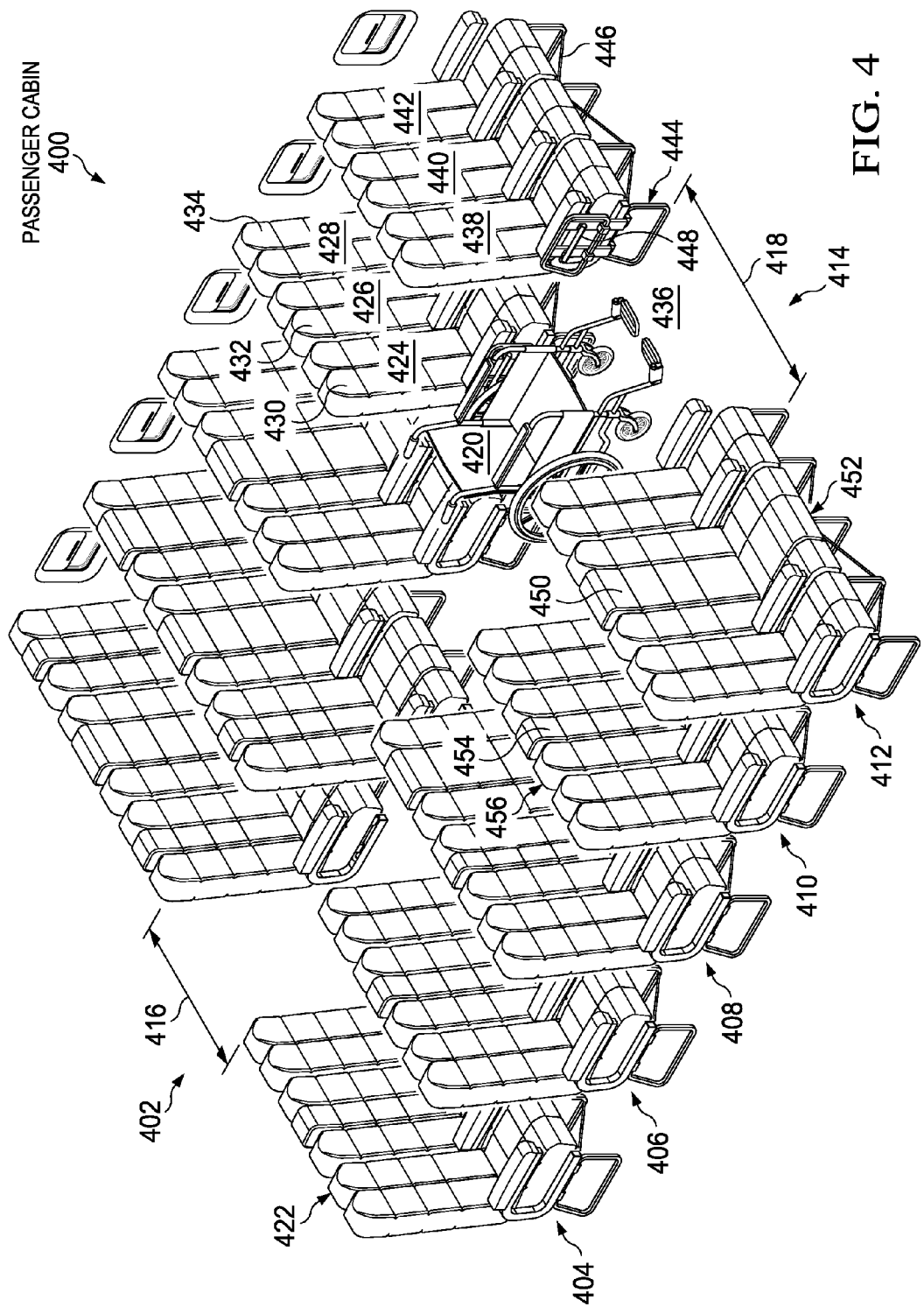
FIG. 4 is a diagram of a passenger cabin in accordance with an advantageous embodiment.

With reference now to FIG. 4, a diagram of a passenger cabin is depicted in accordance with an advantageous embodiment. Passenger cabin 400 is an example of one implementation of passenger cabin 300 in FIG. 3.

In this illustrative example, passenger cabin 400 contains seating system 402, which may have rows 404, 406, 408, 410, and 412 arranged around aisle 414. Aisle 414 may have aisle width 416 and aisle width 418. Aisle width 416 of aisle 414 may be a standard width for aisle 414. Aisle width 418 of aisle 414 may be wider than aisle width 416. Aisle width 418 may be formed through a reconfiguration of seating system 402.

As can be seen in this illustrative example, aisle width 418 may accommodate wheelchair 420. When wheelchair 420 is not present, aisle width 418 may be reduced back to aisle width 416 through a reconfiguration of seating system 402. In these examples, this reconfiguration may be provided through reconfigurable seats 422 in seating system 402. In these examples, each seat in each row may be comprised of reconfigurable seats. In these examples, reconfigurable seats 422 may be implemented using reconfigurable seat 312 in FIG. 3.

Reconfigurable seats 424, 426, and 428 may have width adjustable sections 430, 432, and 434 in a compressed state to provide space 436 for wheelchair 420. Also, in this illustrative example, reconfigurable seats 438, 440, and 442 may be supported by frame 444 which may have support section 446 and reconfigurable hand rail 448. In this illustrative example, reconfigurable hand rail 448 may be in a raised position to allow for passenger use during boarding and/or other activities.

Width adjustable section 450 of reconfigurable seat 452 may be in an expanded state. As another example, width adjustable section 454 of reconfigurable seat 456 may be in an intermediate state.

Each of reconfigurable seats 422 may be independently configured with respect to other seats in reconfigurable seats 422. In this manner, many different configurations may be possible for seating system 402. Further, the configuration of seating system 402 may change during boarding. For example, without limitation, all of reconfigurable seats 422 may be adjusted to provide aisle width 418 for aisle 414 during boarding. As each of rows 404, 406, 408, 410, and 412 may be filled with passengers, those rows may be readjusted to aisle width 416.

Figure 5:
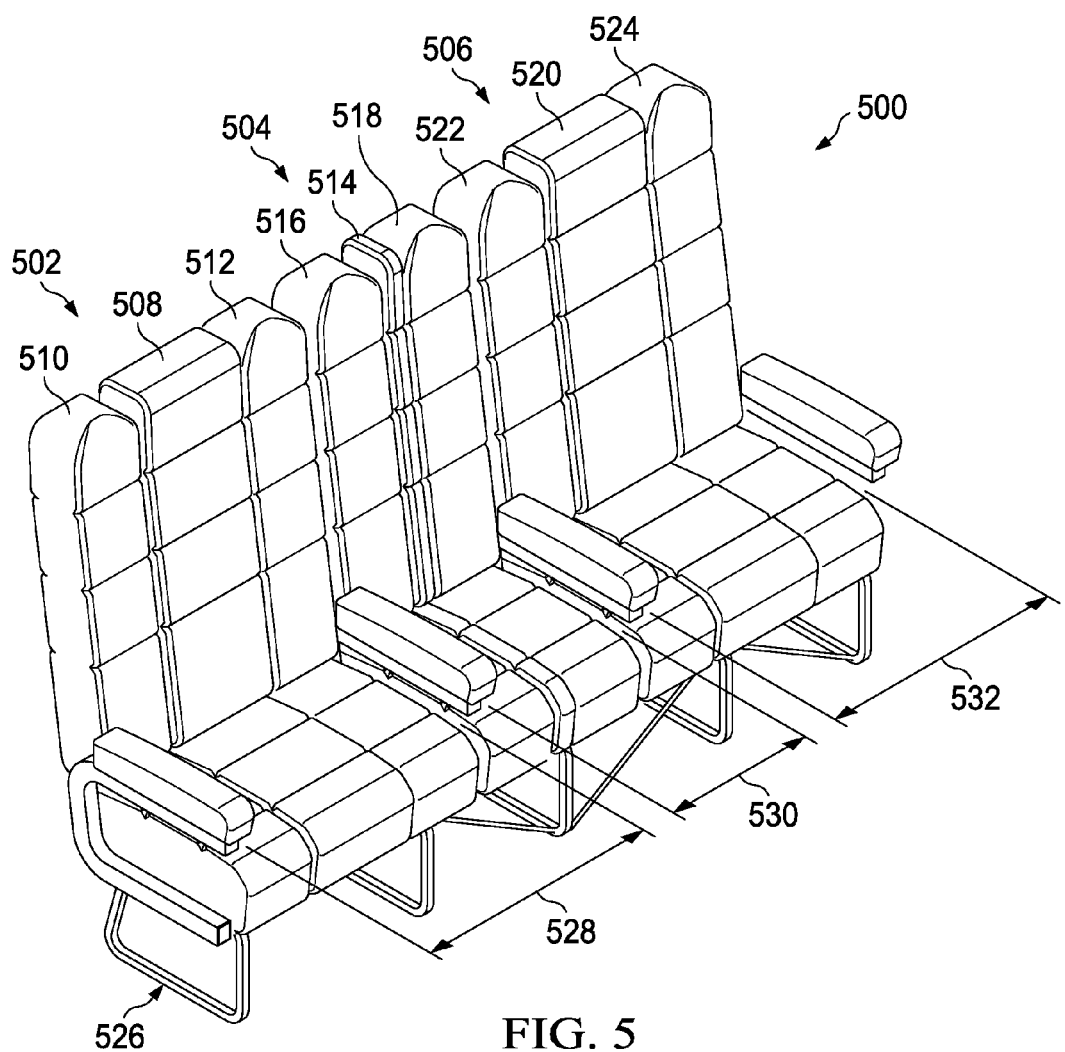
FIG. 5 is a diagram illustrating a portion of a row of reconfigurable seats in accordance with an advantageous embodiment.

With reference now to FIG. 5, a diagram illustrating a portion of a row of reconfigurable seats is depicted in accordance with an advantageous embodiment. In this example, row 500 is an example of a row of seats in a passenger cabin such as, for example, without limitation, passenger cabin 300 in FIG. 3.

In this example, row 500 includes reconfigurable seats 502, 504, and 506. In this example, reconfigurable seat 502 has width adjustable section 508 located between non-adjustable section 510 and non-adjustable section 512. Reconfigurable seat 504 has width adjustable section 514 located between non-adjustable section 516 and non-adjustable section 518. Reconfigurable seat 506 may have width adjustable section 520 located between non-adjustable section 522 and non-adjustable section 524.

Frame 526 provides support for reconfigurable seats 502, 504, and 506 in these illustrative examples. With this configuration, seat 502 has width 528, seat 504 has width 530, and seat 506 has width 532. Width 528 may be around the same width as width 532. Width 528 and width 532 may be larger than width 530. In this illustrative example, width adjustable sections 508 and 520 may be in an expandable state, while width adjustable section 514 may be in a compressed state.

Figure 6:
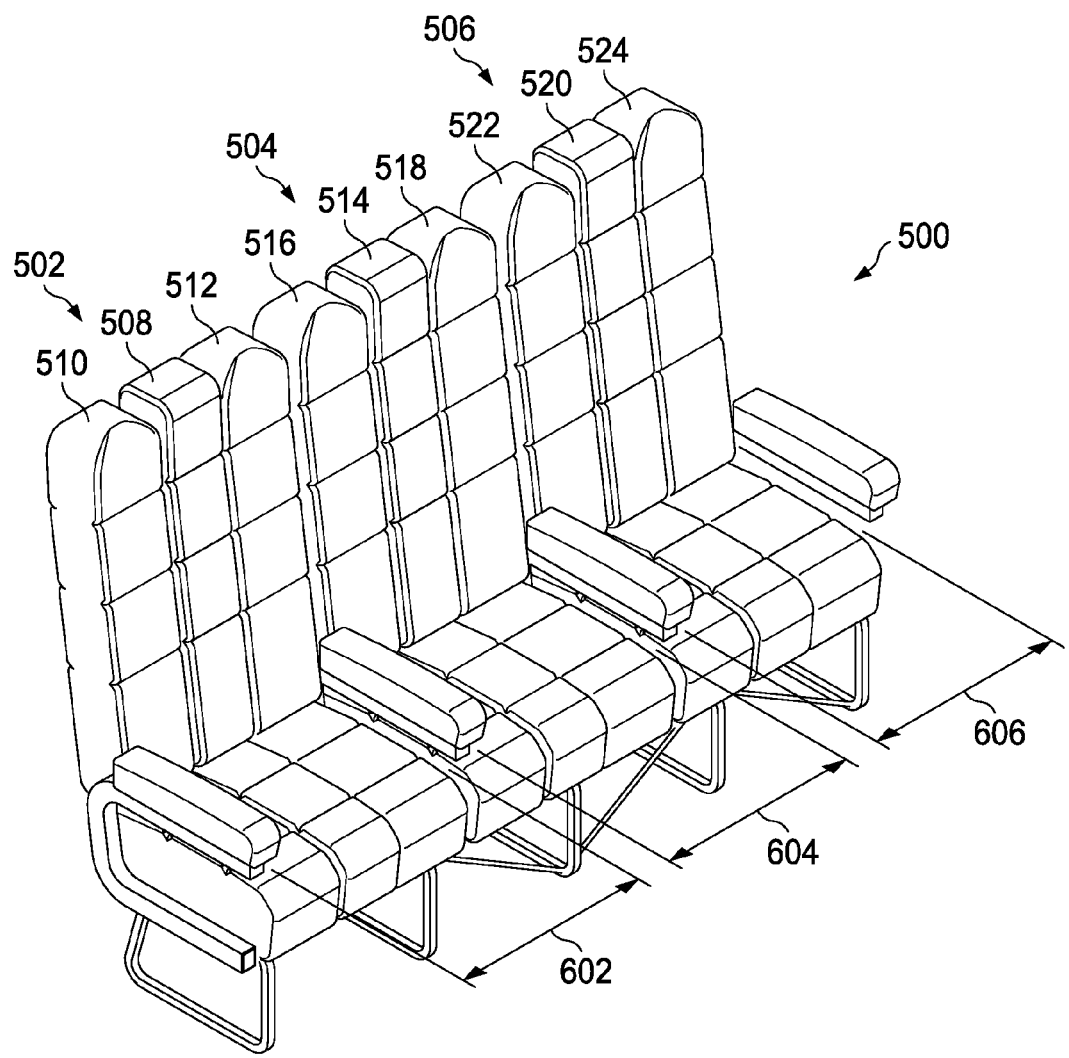
FIG. 6 is another diagram of a portion of a row with reconfigurable seats in accordance with an advantageous embodiment.

With reference now to FIG. 6, another diagram of a portion of a row with reconfigurable seats is depicted in accordance with an advantageous embodiment. In this example, row 500 is shown with width adjustable sections 508, 514, and 520 in an intermediate state. In this example, width 602, width 604, and width 606 may be around the same width.

Figure 7:
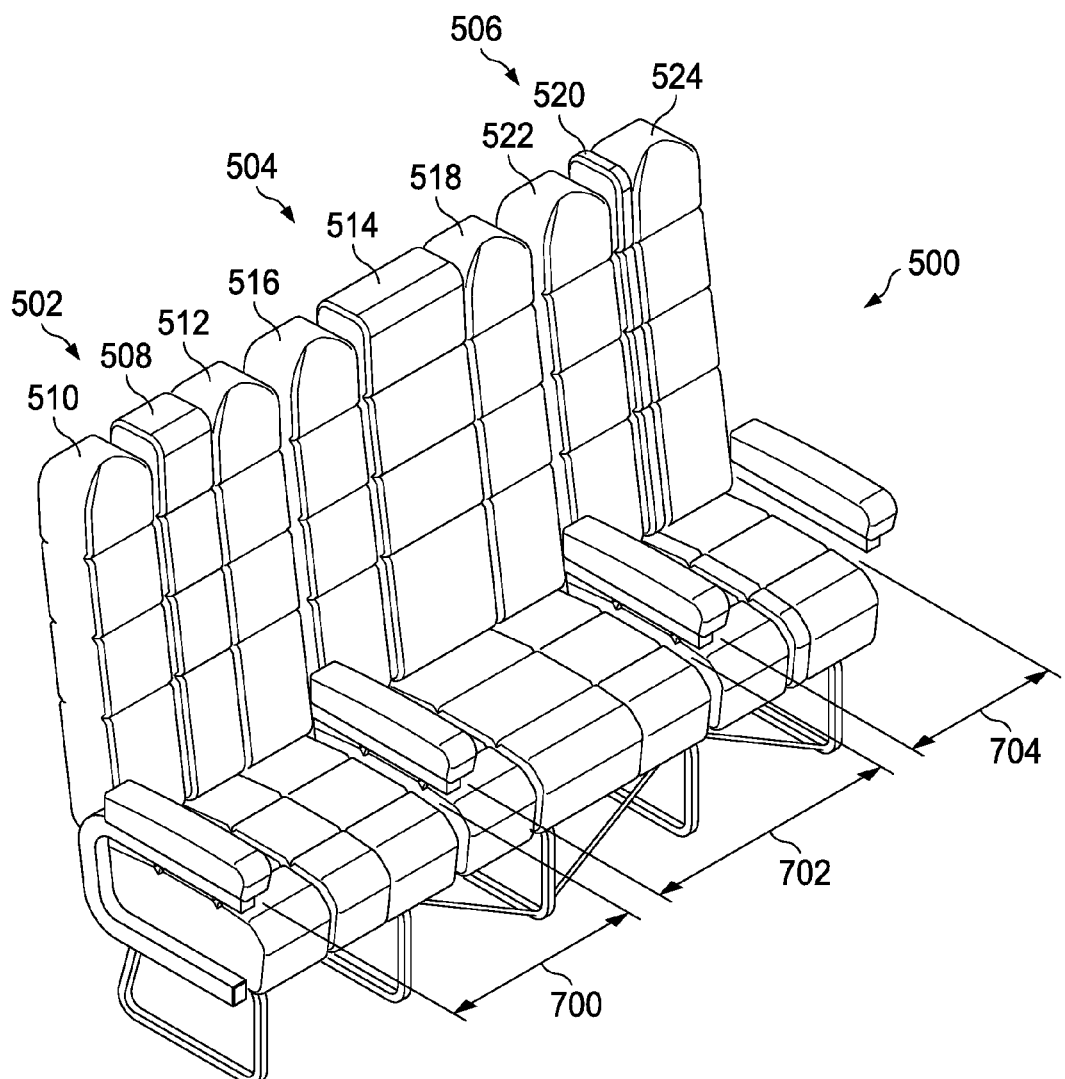
FIG. 7 is another diagram of a portion of a row of reconfigurable seats in accordance with an advantageous embodiment.

With reference now to FIG. 7, another diagram of a portion of a row of reconfigurable seats is depicted in accordance with an advantageous embodiment. In this example, reconfigurable seats 502, 504, and 506 are shown in different states. Width adjustable section 508 may be in an intermediate state, width adjustable section 514 may be in an expanded state, and width adjustable section 520 may be in a compressed state. With these different states, reconfigurable seat 502 may have width 700, reconfigurable seat 504 may have width 702, and reconfigurable seat 506 may have width 704.

In these examples, reconfigurable seats 502, 504, and 506 may be independently adjustable with respect to width. In this manner, each of reconfigurable seats 502, 504, and 506 may be independently configured to tailor the needs of different passengers. For example, without limitation, a child may only require width 704, while an adult may need width 702.

Figure 8:
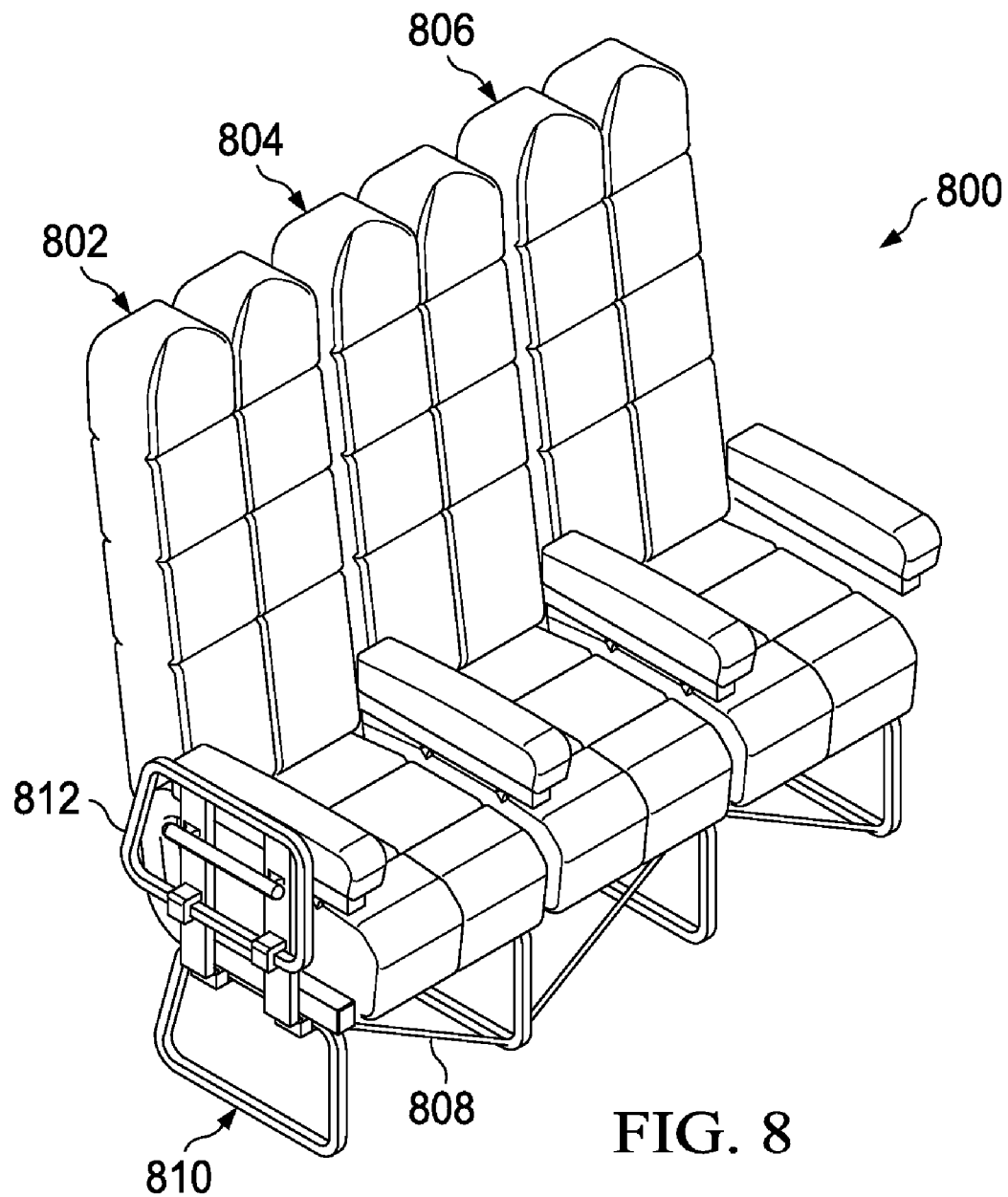
FIG. 8 is a diagram illustrating reconfigurable seats in a compressed state and a reconfigurable hand rail in accordance with an advantageous embodiment.

With reference now to FIG. 8, a diagram illustrating reconfigurable seats in a compressed state and a reconfigurable hand rail is depicted in accordance with an advantageous embodiment. Reconfigurable seats 802, 804, and 806 in row 800 may have been placed into a compressed state such that reconfigurable seats 802, 804, and 806 may be supported by support section 808 of frame 810. Further, frame 810 also may have reconfigurable hand rail 812. In this depicted example, reconfigurable hand rail 812 may be in a raised position.

Figure 9:
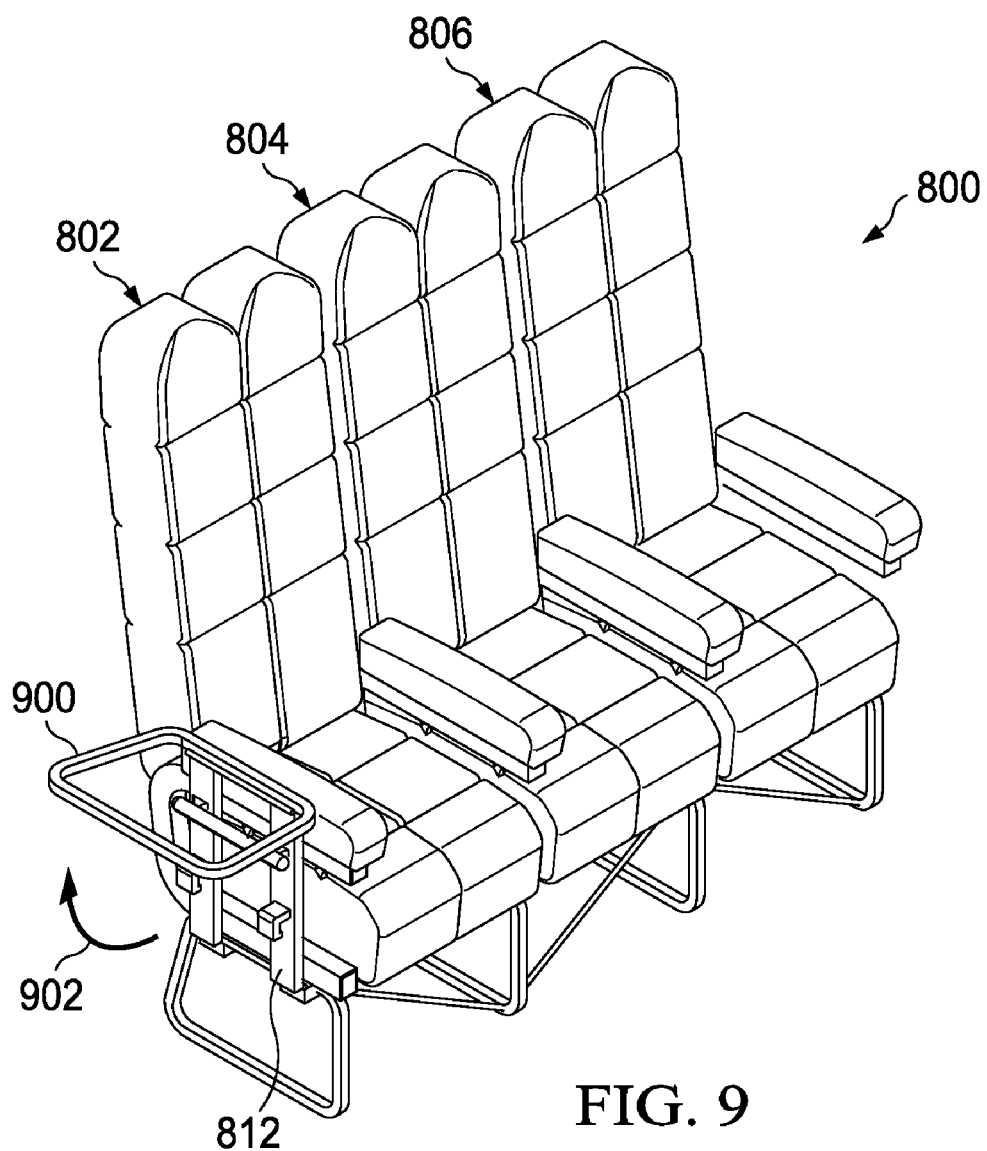
FIG. 9 is a diagram illustrating reconfiguring of a reconfigurable hand rail in accordance with an advantageous embodiment.
Figure 10:
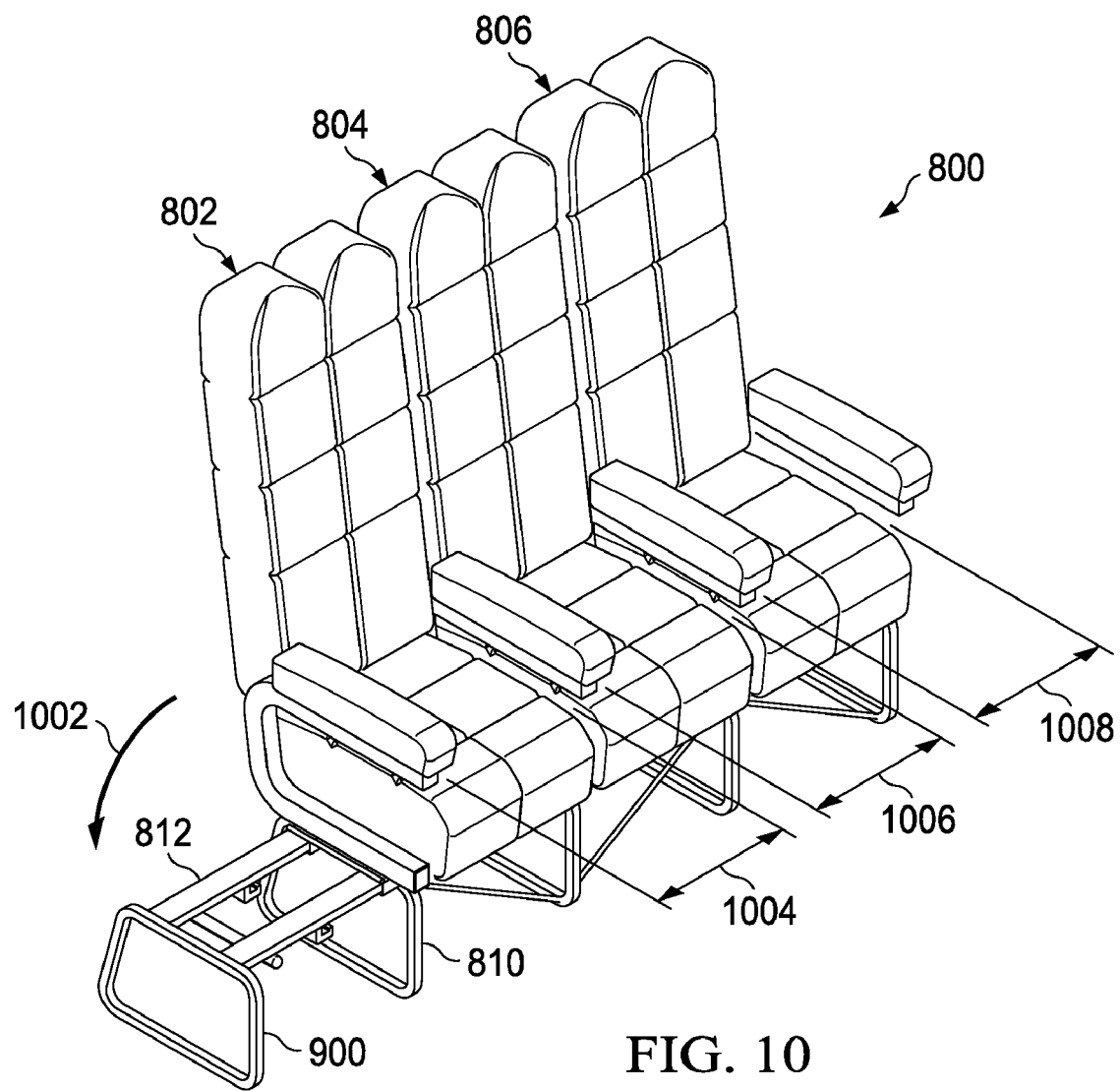
FIG. 10 is a diagram illustrating reconfiguring of a reconfigurable hand rail in accordance with an advantageous embodiment.

With reference now to FIG. 9 and FIG. 10, diagrams illustrating reconfiguration of a reconfigurable hand rail is depicted in accordance with an advantageous embodiment. In FIG. 9, section 900 of reconfigurable hand rail 812 may be raised in the direction of arrow 902. In FIG. 10, section 900 may be lowered in the direction of arrow 1002. In this state, reconfigurable hand rail 812 may be in a lowered position.

In this configuration of frame 810, reconfigurable seats 802, 804, and 806 may be reconfigured to increase widths 1004, 1006, and 1008. In the lowered position, reconfigurable hand rail 812 may provide support for seat 802. This configuration of row 800 may provide greater space for various activities within a passenger cabin. For example, without limitation, the compression of reconfigurable seats within row 800 may increase aisle space for boarding activities. The increased aisle space on a particular row also may be used to provide space for a wheelchair.

Figure 11:
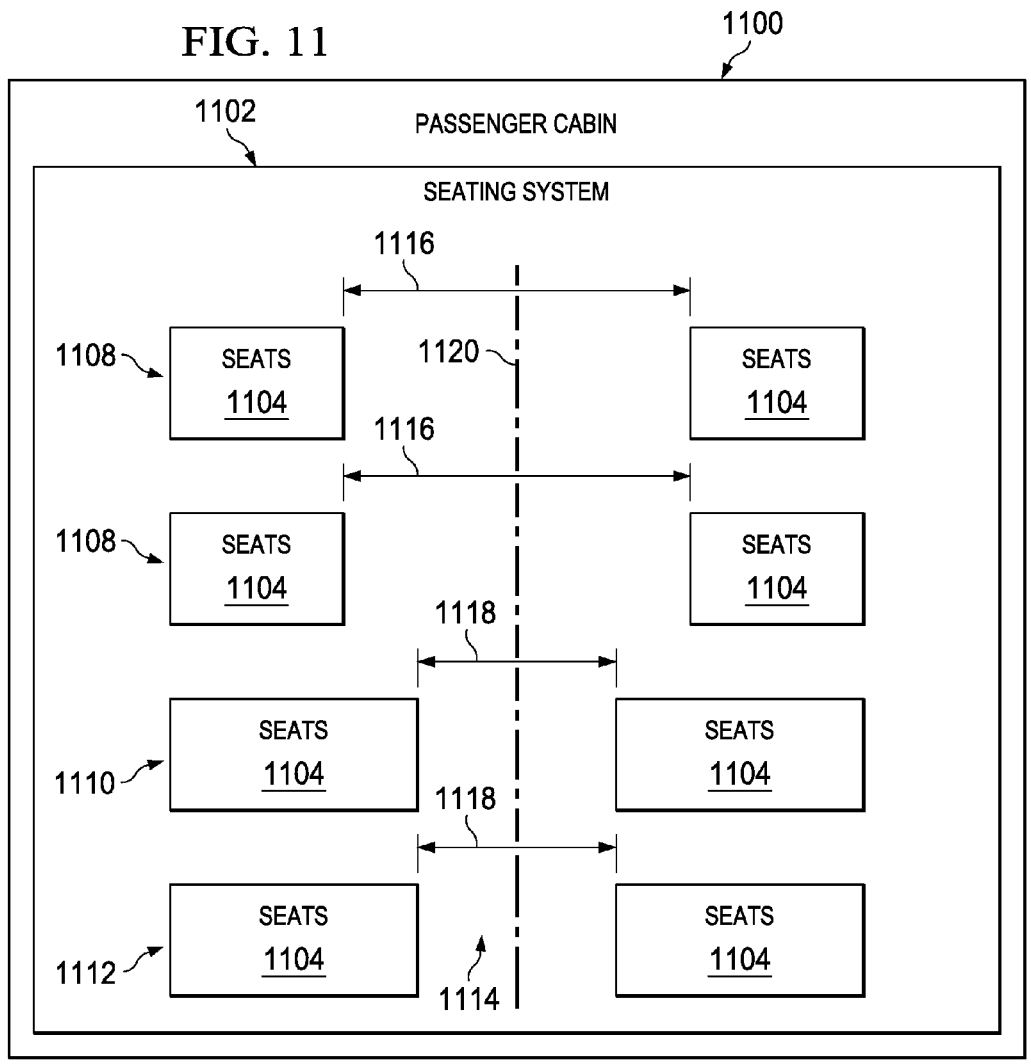
FIG. 11 is a diagram of a portion of a passenger cabin in accordance with an advantageous embodiment.

With reference now to FIG. 11, a diagram of a portion of a passenger cabin is depicted in accordance with an advantageous embodiment. In this example, passenger cabin 1100 is an example of an implementation of passenger cabin 300 in FIG. 3. In this illustrative example, seating system 1102 may have reconfigurable seats 1104 arranged in rows 1106, 1108, 1110, and 1112 arranged to form aisle 1114.

In this illustrative example, rows 1106 and 1108 may have been reconfigured to provide aisle width 1116, while rows 1110 and 1112 may have been reconfigured to provide aisle width 1118. Aisle width 1116 may be present in sections of passenger cabin 1100 in which rows 1106 and 1108 may not have been seated with passengers. In these examples, rows 1110 and 1112 may have been reconfigured to have aisle width 1118 when passengers have been seated in these rows. This reconfiguration of rows 1106, 1108, 1110, and 1112 may be performed as part of the seating operation to board passengers.

In this illustrative example, the different rows may be symmetric about centerline 1120. In other advantageous embodiments, the configuration of the different rows for seating system 1102 may be such that aisle 1115 may not be symmetric about centerline 1120.

Figure 12:
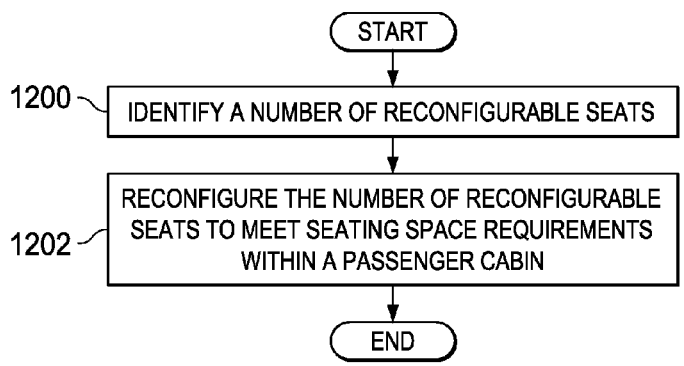
FIG. 12 is a flowchart of a process for reconfiguring a passenger cabin in accordance with an advantageous embodiment.

With reference now to FIG. 12, a flowchart of a process for reconfiguring a passenger cabin is depicted in accordance with an advantageous embodiment. The process illustrated in FIG. 12 may be implemented in a passenger cabin such as, for example, without limitation, passenger cabin 300 in FIG. 3. In these examples, the process may begin by identifying number of reconfigurable seats 308 (operation 1200).

The number of reconfigurable seats 308 may be reconfigured to meet seating space requirements within passenger cabin 300 (operation 1202), with the process terminating thereafter. In operation 1202, the reconfiguration of the number of reconfigurable seats 308 may be performed to increase aisle width 382 in passenger cabin 300. In other advantageous embodiments, operation 1202 also may be performed to increase aisle width 382 to accommodate wheelchair 386 in passenger cabin 300.

The illustration of operations in the flowchart of FIG. 12 has been provided only as an illustration of one manner in which reconfigurable seats may be reconfigured to meet seating space requirements in a passenger cabin. In the different advantageous embodiments, a reconfigurable seat may have a width adjustable section that may be compressed and uncompressed to change the width of the reconfigurable seat.

Each reconfigurable seat may be independently reconfigured in these examples. This type of reconfiguration may provide a mechanism to reconfigure a seating system in a passenger cabin between flights. This type of reconfiguration may not require removing the aircraft from service. This type of reconfiguration may be performed in between flights for the aircraft.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments have been described with respect to aircraft, other advantageous embodiments may be applied to other types of objects.

For example, without limitation, other advantageous embodiments may be applied to a mobile platform, a stationary platform, a land-based structure, an aquatic-based structure, a space-based structure, and/or some other suitable object having a passenger cabin and/or seating area. More specifically, the different advantageous embodiments may be applied to, for example, without limitation, a submarine, a bus, a personnel carrier, a train, a spacecraft, a space station, a surface ship, and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A seating system comprising:
   a seat base;
   a seat back; and
   a width adjustable section located within the seat base and the seat back, wherein the width adjustable section is capable of being configured to change a width of the seat base and the seat back, wherein the width adjustable section comprises a compressible air structure located within the seat base and the seat back.

2. The seating system of claim 1, wherein the seat base comprises a first non-adjustable section and a first portion of the width adjustable section, and wherein the seat back comprises a second non-adjustable section and a second portion of the width adjustable section.

3. The seating system of claim 1, wherein the seat base comprises a first portion of the width adjustable section located between a first non-adjustable section and a second non-adjustable section, and wherein the seat back comprises a second portion of the width adjustable section located between a third non-adjustable section and a fourth non-adjustable section.

4. The seating system of claim 1 further comprising:
   an air pump capable of pressurizing the compressible air structure, wherein a width of the compressible air structure changes.

5. The seating system of claim 4, wherein the compressible air structure comprises:
   a first air bladder located within the seat base; and
   a second air bladder located within the seat back.

6. The seating system of claim 1 further comprising:
   a locking mechanism capable of locking the width adjustable section in a current configuration.

7. The seating system of claim 1 further comprising:
   a frame, wherein the frame supports the seat base.

8. The seating system of claim 7, wherein the seat base is slidably attached to the frame.

9. The seating system of claim 7, wherein the frame comprises:
   a support section supporting the seat base; and
   a reconfigurable hand rail capable of being moved between a raised position and a lowered position when the width adjustable section is compressed.

10. The seating system of claim 1, wherein the seat base, the seat back, and the width adjustable section form a first reconfigurable seat and the width is a first width, and further comprising:
    a second seat base;
    a second seat back; and
    a second width adjustable section located within the second seat base and the second seat back, wherein the second width adjustable section is capable of being configured to change a second width, and wherein the second seat base, the second seat back, and the second width adjustable section form a second reconfigurable seat in which the second width is capable of being changed independently of the first width.

11. The seating system of claim 10, wherein the first reconfigurable seat is located adjacent to the second reconfigurable seat.

12. The seating system of claim 11, wherein the first reconfigurable seat is located adjacent to the second reconfigurable seat and are mounted on a frame.

13. The seating system of claim 12, wherein the first reconfigurable seat and the second reconfigurable seat are slidably mounted on the frame.

14. The seating system of claim 11 further comprising:
    an arm rest located between the first reconfigurable seat and the second reconfigurable seat.

15. The seating system of claim 1, wherein the seating system is located in one of an aircraft, a bus, a train, a spacecraft, and a ferry.

16. A passenger cabin comprising:
    an aisle; and
    a plurality of rows of seats arranged adjacent to the aisle, wherein each seat in a number of seats in the plurality of rows comprises a reconfigurable seat having a seat base, a seat back, and a width adjustable section located within the seat base and the seat back; and
    a number of sensors capable of monitoring a number of reconfigurable seats.

17. The passenger cabin of claim 16, wherein the width adjustable section is capable of being configured to change a seat width of the seat base and the seat back, wherein the number of seats in the plurality of rows is capable of being reconfigured to increase an aisle width of the aisle for boarding passengers.

18. The passenger cabin of claim 16, wherein the width adjustable section is capable of being configured to change a seat width of the seat base and the seat back, wherein the number of seats in the plurality of rows are capable of being reconfigured to change an aisle width of a portion of the aisle to accommodate a wheel chair.

19. The passenger cabin of claim 16 further comprising:
    a monitoring process capable of identifying a state of the number of reconfigurable seats using the number of sensors; and
    a data processing system, wherein the monitoring process is located on the data processing system.

20. The passenger cabin of claim 19 further comprising:
    a configuration process located on the data processing system, wherein the configuration process is capable of sending commands to change a configuration of the number of reconfigurable seats.

21. The passenger cabin of claim 16, wherein the seat base comprises a first non-adjustable section and a first portion of the width adjustable section, and wherein the seat back comprises a second non-adjustable section and a second portion of the width adjustable section.

22. The passenger cabin of claim 16, wherein the seat base comprises a first portion of the width adjustable section located between a first non-adjustable section and a second non-adjustable section, and wherein the seat back comprises a second portion of the width adjustable section located between a third non-adjustable section and a fourth non-adjustable section.

23. The passenger cabin of claim 16, wherein the width adjustable section comprises:
    a compressible air structure located within the seat base and the seat back.

24. A method for reconfiguring a passenger cabin, the method comprising:
    identifying a number of reconfigurable seats, wherein each reconfigurable seat in the number of reconfigurable seats comprises a seat base, a seat back, and a width adjustable section located within the seat base and the seat back; and reconfiguring one or more of the number of reconfigurable seats to meet seating space requirements within the passenger cabin by means of an air pump capable of pressurizing a compressible air structure located within each seat base and each seat back.

25. The method of claim 24, wherein the step of reconfiguring the number of reconfigurable seats to meet the seating space requirements within the passenger cabin comprises:

reconfiguring the number of reconfigurable seats to increase an aisle width in the passenger cabin.

26. The method of claim 24, wherein the step of reconfiguring the number of reconfigurable seats to meet the seating space requirements within the passenger cabin comprises:

reconfiguring the number of reconfigurable seats to increase an aisle width in a portion of the passenger cabin to accommodate a wheelchair in the portion of the passenger cabin.

* * * * *